(12) United States Patent
Raghurama et al.

(10) Patent No.: US 9,422,169 B2
(45) Date of Patent: Aug. 23, 2016

(54) WATER PURIFICATION COMPOSITIONS OF MAGNESIUM OXIDE AND APPLICATIONS THEREOF

(71) Applicant: HONEYWELL INTERNATIONAL INC., Morristown, NJ (US)

(72) Inventors: Raju Raghurama, Bangalore (IN); Srinivas S N Mutukuri, Bangalore (IN); Abhilasha Srivastava, Bangalore (IN); Reddappa Reddy Kumbarageri, Bangalore (IN); Rajiv Banavali, Morristown, NJ (US); Michael Fooken, Seelze (DE)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/235,206

(22) PCT Filed: Sep. 26, 2012

(86) PCT No.: PCT/IN2012/000644
§ 371 (c)(1),
(2) Date: Jan. 27, 2014

(87) PCT Pub. No.: WO2013/046232
PCT Pub. Date: Apr. 4, 2013

(65) Prior Publication Data
US 2014/0374650 A1    Dec. 25, 2014

(30) Foreign Application Priority Data
Sep. 26, 2011 (IN) .......................... 3315/CHE/2011

(51) Int. Cl.
| | | |
|---|---|---|
| *B01J 20/04* | (2006.01) | |
| *C02F 1/28* | (2006.01) | |
| *B01J 20/06* | (2006.01) | |
| *B01J 20/10* | (2006.01) | |
| *B01J 20/28* | (2006.01) | |
| *B01J 20/30* | (2006.01) | |
| *C02F 1/66* | (2006.01) | |
| *C02F 101/10* | (2006.01) | |
| *C02F 101/14* | (2006.01) | |

(52) U.S. Cl.
CPC ............... *C02F 1/281* (2013.01); *B01J 20/041* (2013.01); *B01J 20/043* (2013.01); *B01J 20/06* (2013.01); *B01J 20/10* (2013.01); *B01J 20/2803* (2013.01); *B01J 20/28004* (2013.01); *B01J 20/28057* (2013.01); *B01J 20/3021* (2013.01); *B01J 20/3078* (2013.01); *B01J 20/3085* (2013.01); *C02F 1/288* (2013.01); *B01J 2220/42* (2013.01); *B01J 2220/46* (2013.01); *B01J 2220/62* (2013.01); *C02F 1/285* (2013.01); *C02F 1/66* (2013.01); *C02F 2101/103* (2013.01); *C02F 2101/14* (2013.01)

(58) Field of Classification Search
CPC ....................................... B01J 20/041
USPC .......................................... 252/181
See application file for complete search history.

(56) References Cited

U.S. PATENT DOCUMENTS

| | | | | |
|---|---|---|---|---|
| 6,861,002 | B2 * | 3/2005 | Hughes | ............ 210/681 |
| 2003/0196960 | A1 | 10/2003 | Hughes | |
| 2004/0159605 | A1 * | 8/2004 | Hughes | ............ 210/503 |

FOREIGN PATENT DOCUMENTS

GB    1527753    10/1978

OTHER PUBLICATIONS

International Search Report dated Feb. 8, 2013 from PCT/IN2012/0006444.

* cited by examiner

*Primary Examiner* — Peter F Godenschwager
(74) *Attorney, Agent, or Firm* — Colleen D. Szuch

(57) ABSTRACT

The present disclosure provides a composition for purifying water comprising a magnesium oxide component and a binder. The magnesium oxide component includes magnesium oxide, a pH regulator, and an additional water purifying material. The binder can be an organic polymer, an inorganic binder, or a combination of both.

22 Claims, No Drawings

WATER PURIFICATION COMPOSITIONS OF MAGNESIUM OXIDE AND APPLICATIONS THEREOF

CROSS-REFERENCES TO RELATED APPLICATIONS

This application is a U.S. National Stage of PCT Application No. PCT/IN2012/000644, filed Sep. 26, 2012, which application is related to and claims the priority benefit of Indian Application No. 3315/CHE/2011, filed on Sep. 26, 2011, the entirety of which is incorporated herein by reference.

TECHNICAL FIELD

The present invention relates to compositions of magnesium oxide and at least one polymer, methods of water purification using such compositions, and methods of preparing the same.

BACKGROUND

Contamination of potable water and inadequate access to purified potable water fit for human consumption is an alarming issue across the world. Contamination of potable water with inorganic ions and heavy metals, such as arsenic contamination and fluoride contamination, is especially harmful. Arsenic and fluoride contaminations, which are usually of geological origins, are mainly prevalent with ground water. Arsenic contamination through drinking water may cause cancer of skin, lungs, urinary bladder, and kidney, as well as other skin diseases. The current applicable regulations of the U.S. Environmental Protection Agency set the maximum limits of arsenic at 10 parts per billion (ppb) in drinking water, although compared to the rest of the United States, western states have more systems with arsenic levels greater than this standard. High fluoride concentration in ground water beyond the permissible limit of 1.5 parts per million (ppm) is an acute toxicological problem. Prolonged ingestion of high quantities of fluoride can lead to dental or skeletal fluorosis.

Some purification means must be employed to remove arsenic and control the level of fluoride in drinking water prior to consumption. The problem is compounded by the presence of minerals, including carbonates, which interfere with many purification schemes and systems. Particularly with water obtained from areas with geologic evidence of volcanic activity, both high arsenic levels and high mineral content, including carbonates, are typical.

There have been a number of systems used to remove arsenic and other heavy metals from water, including primarily reverse osmosis, column purification, and hydroxide precipitation. Many of these processes provide acceptable results only within narrow and restrictive parameters. In addition, many if not most of these processes are costly and comparatively inefficient.

Conventionally, Magnesium Oxide (MgO) is used for water purification as MgO is proven to be very effective in adsorbing arsenic and fluoride ions when these ions come in contact with the surface of MgO. Further, MgO is also abundant in nature, thereby making it easily available at affordable prices. While MgO is effective for arsenic and fluoride removal from water, its tendency to form paste or slurry, due to formation of magnesium hydroxide when contacted with water, is one of the main drawbacks in water purification applications. Hence when MgO is used for purifying water in a purifying system or a medium, the flow rate of the purified water decreases slowly and stops eventually requiring that the MgO be removed from the system.

Therefore, there is a need to develop a technology for water purification that provides effective removal of arsenic and fluoride from water, while avoiding one or more of the above-referenced drawbacks.

SUMMARY

Provided herein is a water purification composition containing a magnesium oxide component and a binder. In certain embodiments, the binder is selected from the group consisting of a polymeric binder, calcium aluminum silicate, and combinations of these. In certain embodiments, the polymeric binder is selected from the group consisting of polymethyl methacrylate, polyethylene, and combinations of these, and is present in the composition in an amount of from about 12% to about 20% by weight. In other embodiments, the binder contains calcium aluminum silicate in an amount of from about 1% to about 15% by weight.

In certain preferred embodiments, the magnesium oxide component includes MgO, a pH regulator, and an additional water purifying material. In certain embodiments, the pH regulator can include $CaCO_3$, and the additional water purifying material can be selected from the group consisting of $Fe_2O_3$, $MgAl_2O_4$, and combinations of these.

In certain preferred embodiments, the compositions provided by the present invention are in the form of porous granules having a diameter of from about 0.2 to about 1 mm, and a surface area of from about 10 $m^2/g$ to about 200 $m^2/g$.

The present disclosure also provides a method of purifying water using the water purification compositions described herein. Yet another aspect of the present invention is an apparatus configured to purify water containing the compositions described herein.

DETAILED DESCRIPTION

The present disclosure provides a composition for purifying water comprising a magnesium oxide component and a binder. In certain embodiments, the magnesium oxide component includes magnesium oxide, a pH regulator, and an additional water purifying material. In certain embodiments, the binder can be an organic polymer, an inorganic binder, or a combination of both. Applicants have found that such compositions effectively remove arsenic and fluoride ions from water, without causing any decrease in the flow rate of the purified water through conventional filtration procedures.

While not wishing to be bound by theory, in certain embodiments it is believed that magnesium oxide reacts with water to form $Mg(OH)_2$. The resulting $Mg(OH)_2$ is a strong adsorbent of arsenic and fluoride. The complex consisting of arsenic adsorbed on $Mg(OH)_2$ can be subsequently removed from the water by conventional means, including filtration, settling, skimming, vortexing, centrifugation, magnetic separation, or other well-known separation systems. However, removal of the arsenic-$Mg(OH)_2$ complex is difficult by convention means because of the tendency to become a paste or slurry in water.

Applicants have surprisingly found that when the magnesium oxide component is bound to a binder, the problems previously associated with the use of magnesium oxide in a water purification system are obviated. While not wishing to be bound by theory, applicants believe that the binder allows for the selection of parameters optimizing the adsorption of arsenic and fluoride, while simultaneously preventing the formation of a paste or slurry once MgO is contacted with water. For example, in certain embodiments the binder allows for the formation of granules with large surface areas that increase the rate of arsenic and fluoride adsorption. Other parameters effecting the rate of adsorption include the number of active sites present in the granules, such as corners and edges, the presence and type of pores, and the types of surface planes exposed to the arsenic and fluoride.

Applicants have also surprisingly found that when the magnesium oxide component is combined with a binder in an amount effective to remove arsenic and fluoride from pretreated water in a purification medium or system, the utilization of such compositions in the medium or system results in an adequate flow rate of water that is greater than the flow rate in an analogous medium or system in which the binder is not present. Applicants have surprisingly found that the binder attaches to the magnesium oxide component to reduce the formation of a paste or slurry, which maintains the desired flow rate of water through the relevant water purification system. An optimized binder will provide the required porosity and binding strength to hold the structure of the magnesium oxide component in place, rather than forming a paste or slurry, thereby maintaining the desired flow rate of water and adsorption properties. Accordingly, the presence of the binder obviates the problem associated with prior compositions and methods in which the medium or system becomes clogged.

The Binder

In one embodiment of the present invention, the binder comprises a polymeric binder. In certain preferred embodiments, the organic binder is selected from the group consisting of methacrylates, polyethylene, acrylates, polypropylene, and combinations thereof. In certain preferred embodiments, the polymeric binder is selected from the group consisting of polymethyl methacrylate, polyethylene, and combinations thereof. Other examples of suitable polymeric binders are readily apparent and known to those skilled in the art. In certain embodiments, the polymeric binder is present in an amount of from about 10% to about 20% by weight, preferably 12% to about 18% by weight, and more preferably from about 14% to about 16% by weight.

The inventive compositions including the polymeric binder can be prepared by dissolving the binder in an organic solvent and adding it to the magnesium oxide component. Examples of suitable organic solvents include, and are not limited to aromatic solvents, such as toluene, benzene, mixed xylenes, and aliphatic solvents such as hexanes, octanes, paraffins, mineral oils, ketones such as acetone, esters such as ethyl acetate, amides such as N-methyl-2-pyrrolidone (NMP), and combinations thereof. In certain preferred embodiments, the organic solvent includes xylene. Other examples of suitable organic solvents are readily apparent and known to those skilled in the art. Methods of preparing such compositions are discussed in further detail below.

In another embodiment of the present invention, the binder includes an aluminum calcium silicate binder. Other suitable inorganic binders include, but are not limited to, aluminum silicates such as sodium, magnesium, and barium aluminum silicates. Applicants have found that in such embodiments, the need for an organic solvent in preparing the inventive composition is obviated because the aluminum silicate binder uniformly disperses in an aqueous solution containing the magnesium oxide component. Methods of preparing such compositions are discussed in further detail below. In certain embodiments, the calcium aluminum silicate binder is present in an amount of from about 1% to about 15% by weight, preferably from about 1% to about 10% by weight, and more preferably of from about 1% to about 5% by weight, and even more preferably about 2% to about 4% by weight.

The Magnesium Oxide Component

As discussed above, the magnesium oxide component comprises MgO which reacts with water to form $Mg(OH)_2$, a strong adsorbent for arsenic and fluoride. In embodiments including a polymeric binder, the magnesium oxide component is present in the inventive composition in an amount of from about 80% to about 90% by weight, preferably from about 82% to about 88% by weight, and even more preferably about 84% to about 86% by weight. In embodiments including a calcium aluminum silicate binder, the magnesium oxide component is present in an amount of from about 85% to about 99% by weight, preferably 87% to about 95% by weight, and more preferably from about 89% to about 91% by weight.

In certain embodiments, the magnesium oxide component includes MgO, a pH regulator, and an additional water purifying material. The MgO can be obtained from any commercially available source. In one embodiment, the magnesium oxide component consists essentially of MgO. In certain embodiments including a polymeric binder, the magnesium oxide component contains MgO in an amount of from about 40% to about 100% by weight, preferably from about 40% to about 60% by weight, and more preferably about 45% to about 50% by weight. In certain embodiments including a calcium aluminum silicate binder, the magnesium oxide component contains MgO in an amount of from about 10% to about 40% by weight, preferably from about 15% to about 35% by weight, and more preferably from about 20% to about 30% by weight.

The pH Regulator in certain embodiments, the magnesium oxide component includes a pH regulator. A pH regulator in accordance with the present invention is a compound that changes the pH of water when added, to provide water having a pH that is suitable for human consumption, such as a pH less than about 8. Accordingly, in certain embodiments the pH regulator decreases the pH of water when added. In certain preferred embodiments, the pH regulator is $CaCO_3$. While the presence of $CaCO_3$ typically caused the conversion of $Mg(OH)_2$ to $MgCO_3$, Applicants have surprisingly found that $CaCO_3$ as used in the present invention, does not adversely affect the adsorption of arsenic or fluoride by the magnesium oxide component.

In certain embodiments, the pH regulator may include natural zeolites. Examples of such zeolites are described in A. Filippidis & N. Kantiranis, *Experimental Neutralization of Lake and Stream Waters from N. Greece using Domestic HEU-type Rich Natural Zeolitic Material*, Desalination 213 (2007) 47-55, the contents of which are incorporated herein by reference. Other examples of suitable pH regulators are readily apparent and known to those skilled in the art.

In certain embodiments, the pH regulator is present in an amount of from about 5% to about 25% by weight, preferably from about 7% to about 20% by weight, and more preferably about 9% to about 15% by weight. In certain embodiments including a polymeric binder, the magnesium oxide component contains $CaCO_3$ in an amount of from about 8% by weight to about 20% by weight, and preferably from about 9% to about 10% by weight. In certain embodiments including a calcium aluminum silicate binder, the magnesium oxide component contains $CaCO_3$ in an amount of from about 7% by weight to about 10% by weight, and preferably from about 8% to about 9% by weight.

Accordingly, the present invention provides in one embodiment a water purification composition containing from about 80% to about 88% by weight of a magnesium oxide component and a polymeric binder in an amount of from about 12% to about 20% by weight of the composition. In certain embodiments, the magnesium oxide component contains $CaCO_3$ in an amount of from about 9% to about 20% of by the weight of the magnesium oxide component. In certain preferred embodiments, the magnesium oxide component contains about 9% by weight of calcium carbonate by weight of the magnesium oxide component.

In another embodiment, the present invention provides a water purification composition containing about 90% by weight of a magnesium oxide component and about 2% by weight of a calcium aluminum silicate binder. In certain preferred embodiments, the magnesium oxide component contains $CaCO_3$ in an amount of about 7% by weight of the magnesium oxide component.

Additional Water Purifying Material

In certain embodiments, the magnesium oxide component in the composition contains at least one water purifying material that can render water free from contaminants, such as inorganic ions and/or heavy metals. Contaminants that may be removed by the additional water purifying material include, but are not limited to, copper, uranium, manganese, mercury, nickel, chromium, selenium, cadmium, iron, zinc, cobalt, lead, aluminum, barium, bismuth, antimony, chromate, nitrate, silica, perchlorate, phosphate, chloride, fluoride, and cyanide. In certain preferred embodiments, the additional water purifying material contains ferric oxide ($Fe_2O_3$), titanium dioxide ($TiO_2$), magnesium aluminum oxide (spinel, $MgAl_2O_4$), or combinations of these.

In certain embodiments including a polymeric binder, the magnesium oxide component contains $Fe_2O_3$ in an amount of from about 30% to about 50% by weight, preferably 35% to about 45% by weight, and more preferably from about 39% to about 41% by weight. In certain embodiments including a calcium aluminum silicate binder, the magnesium oxide component contains $Fe_2O_3$ in an amount of from about 60% to about 70% by weight. In certain embodiments, the magnesium oxide component of the inventive composition contains $MgAl_2O_4$ in an amount of from about 1% to about 5% by weight, and preferably from about 1% to about 2% by weight.

Mgo Particle Size

The size of MgO or the other ingredients present in the composition of the present subject matter vary depending on reaction conditions present in the purification system or method. The rate of chemical reactions involving solid substances is dependent on parameters such as surface area, number of active sites like corners and edges, and the presence and type of pores including type of surface planes exposed to the reactant. Accordingly, the size of MgO or the other ingredients of the composition is such that it facilitates in providing effective adsorption and removal of arsenic (III) and/or (V) and fluoride ions from the water. In certain embodiments, MgO of a suitable particle size can be prepared by a rapid thermal decomposition, plasma spraying, combustion, or any other process resulting in high surface area powders. Suitable rapid thermal decomposition, plasma spraying, and combustion processes are readily apparent and known to those skilled in the art. Such thermal decomposition processes include those described in P. P. Fedorov et al., *Preparation of MgO Nanoparticles*, Inorganic Materials, 2007, Vol. 43, No. 5, pp. 502-504, the contents of which are incorporated herein by reference. Suitable plasma spraying processes include those described in L. Marcinauska, *Deposition of Alumina Coatings from Nanopowders by Plasma Spraying*, Materials Science, 2010, Vol. 16, No. 1, the contents of which are incorporated herein by reference. Suitable combustion processes include those described in B. Nagappa and G. T. Chandrappa, *Mesoporous Nanocrystalline Magnesium Oxide for Environmental Remediation*, Microporous and Mesoporous Materials, 2007, Vol. 106, Issues 1-3, pp. 2212-218, the contents of which are incorporated herein by reference. The larger the surface area of a particle, the greater number of active sites available for arsenic and fluoride adsorption, such as at corners and edges. The larger surface area also provides pores due to a large number of oxygen vacancy defects.

In certain embodiments, the magnesium oxide component of the water purification composition contains MgO with a diameter in the submicron range. In certain preferred embodiments, the MgO has a diameter of from about 200 nm to about 1.0 mm, more preferably from about 200 nm to about 800 nm, more preferably from about 200 nm to about 400 nm, and even more preferably from about 200 nm to about 300 nm.

Applicants have found that the maximum adsorption capability of the composition can be optimized by altering the surface area of the composition. The composition of the present invention can be formulated in various forms including powder and granule form. In certain preferred embodiments, the composition is in the form of granules. Accordingly, in certain preferred embodiments the surface area of the granules formed from the magnesium oxide component and binder is in the range of from about 10 $m^2$/g to about 200 $m^2$/g, more preferably from about 100 $m^2$/g to about 200 $m^2$/g, and even more preferably from about 150 $m^2$/g to about 200 $m^2$/g.

Accordingly, in certain preferred embodiments the present invention provides a water purification composition containing about 85% by weight of a magnesium oxide component and about 15% by weight of polymethyl methacrylate. The magnesium oxide component contains about 50% by weight of MgO, about 41% by weight of $Fe_2O_3$, and about 9% by weight of $CaCO_3$. In such embodiments, the composition is in the form of granules having an average diameter in the range of from about 0.4 mm to about 0.8 mm.

In another preferred embodiment, the present invention provides a water purification composition containing about 85% by weight of a magnesium oxide component and about 15% by weight of polymethyl methacrylate. The magnesium oxide component contains about 50% by weight of MgO, about 40% by weight of $Fe_2O_3$, about 1% by weight of $MgAl_2O_4$, and about 9% by weight of $CaCO_3$. In such embodiments, the composition is in the form of granules having an average diameter in the range of from about 0.4 mm to about 0.8 mm.

In another preferred embodiment, the present invention provides a water purification composition containing about 90% by weight of a magnesium oxide component and about 2% by weight of a calcium aluminum silicate. The magnesium oxide component contains about 30% by weight of MgO, about 60% by weight of $Fe_2O_3$, about 1% by weight of $MgAl_2O_4$; and about 7% by weight of $CaCO_3$. In such embodiments, the composition is in the form of granules having an average diameter in the range of from about 0.2 mm to about 1.0 mm, preferably from about 0.3 mm to about 0.7 mm, and more preferably about 0.4 mm.

Methods of Preparation

In certain embodiments including a polymeric binder, the inventive water purification compositions may be prepared by mixing together a magnesium oxide component and a polymeric binder, wherein the magnesium oxide component is present in an amount of from about 80% to about 88% by weight and the polymeric binder is present in an amount of from about 12% to about 20% by weight. The magnesium oxide component is prepared by mixing from about 90% to about 92% by weight of MgO and from about 8% to about 10% by weight of calcium carbonate to form a magnesium oxide component. In certain embodiments, the magnesium oxide component is prepared by mixing from about 40% to about 50% by weight of MgO, from about 30% to about 40% by weight of $Fe_2O_3$, and from about 20% to about 10% by weight of $CaCO_3$. The polymeric binder is prepared by dissolving a predetermined amount of polymer in an organic solvent (such as, for example, xylene). The polymer includes at least one polymer selected from polymethyl methacrylate, polyethylene, or a combination thereof. Subsequently, the composition, which is in the form of a slurry, is formed into flake-like structures by drying in an oven at a temperature of from about 160° C. to about 200° C., preferably 170° C. to about 190° C., and more preferably about 180° C. for about 30 minutes to about 60 minutes, more preferably about 45 minutes, at ambient pressure. The flakes may then be converted into granules having an average diameter of from about 0.4 mm to about 0.8 mm, for example, by the process of mechanical milling, or any other appropriate process which would be readily apparent to one skilled in the art. The granules thus prepared may then be filled in filter cartridges to accommodate a required quantity of the composition to remove arsenic and fluoride ions. Examples of such filters include, but are not limited to, cylindrical cartridges having a length of about 80 mm and a diameter of about 90 mm, accommodating of from about 250 to about 260 grams of granulated material. Such cartridges are suitable for filtering about 1,500 L of water. The quantity of the composition utilized in the filter is dependent on the contaminant level of the water being purified. For example, about 50 g of granulated material can be used to adequately filter water containing about 50 ppb arsenic.

In certain embodiments including a calcium aluminum silicate binder, the inventive water purification compositions may be prepared by mixing a magnesium oxide component with a calcium aluminum silicate binder, wherein the magnesium oxide component is present in an amount of about 90% and the calcium aluminum silicate component is present in an amount of from about 1% to about 5% by weight. The magnesium oxide component contains from about 20% to about 30% by weight of MgO, from about 60% to about 70% by weight of $Fe_2O_3$, from about 8% to about 10% by weight of $CaCO_3$. In certain other embodiments, the magnesium oxide component also contains from about 1% to about 2% by weight of $MgAl_2O_4$. The calcium aluminum silicate is dispersed in water and added to the magnesium oxide component. The resulting composition is subsequently formed into a flake-like structure and granules as described above.

In certain embodiments, prior to formation of the flake-like structure, the composition can be mixed with a sufficient quantity of an inorganic or organic blowing agent in the range of from about 1% to about 10% by weight. In such embodiments, the blowing agent is released by heating the granules at a temperature of from about 180° C. to about 200° C. for about 30 to about 45 minutes. Release of the blowing agent results in granules having sufficient pores to maximize the surface area of the granule coming into contact with the contaminated water.

A blowing agent is a substance which is capable of producing a structure via a foaming, gas release, or related mechanisms to create pores in a matrix, thereby producing cellular material. Examples of blowing agent suitable for use with the inventive compositions include, but are not limited to, organic hydrocarbons, such as pentane, isopentane, and cyclopentane, liquid $CO_2$, and other chemical blowing agents, such as hydrazine and other nitrogen-based materials, and sodium bicarbonate.

The granules thus prepared may then be filled in filter cartridges to accommodate a required quantity of the composition to remove arsenic and fluoride ions.

Methods Utilizing the Water Purification Compositions

In another embodiment, the present invention provides a method for treating water, said method comprising contacting a pre-determined volume of contaminated water with a pre-determined amount of the composition of the present subject matter.

In yet another embodiment, the disclosure provides a water purification device or an apparatus configured to purify water, comprising a composition in accordance with the present disclosure. Suitable apparatuses include, but are not limited to, a cylindrical cartridge filled with the water purification composition. In certain embodiments, the cylindrical cartridge has a length of from about 80 mm to about 160 mm, and a diameter of from about 90 mm to about 50 mm. In certain embodiments, the cylindrical cartridge is about 80 mm long with a diameter of about 90 mm and can be filled with about 250 g to about 270 g of the water purification composition. In other embodiments, the cylindrical cartridge is about 100 mm long with a diameter of about 80 mm can be filled with about 135 g to about 140 g of the water purification material. In yet another embodiment, the cylindrical cartridge is about 160 mm long with a diameter of about 50 mm can accommodate about 135 g to about 150 g of the water purification composition. Such cartridges are capable of removing arsenic from reference samples containing arsenic at levels of about 350 ppb to levels below 10 ppb levels for volumes of about 1500 L to 1000 L.

Conventional filtration procedures may be used in the process of the invention, with percolation of the feed through a bed of the water purification composition in a column of suitable dimensions generally being most convenient and efficient. Optimum values of parameters such as grain size and bed depth of the composition, dimensions of the column, flow rates, and desired degree of removal of arsenic and fluoride are all interdependent, as well as being dependent on the nature of the feed, and are best determined experimentally.

EXAMPLES

The following examples are provided for the purpose of illustrating the present invention, but without limiting the scope thereof.

Examples 1-3

Preparation of Granules Including a PMMA Binder

Example Compositions 1-3 were prepared by using the amounts and ratios described in Table 1 below. The polymethyl methacrylate (PMMA) was completely dissolved in Xylene resulting in a viscous media by heating the solution at a temperature of about 60° C. to about 65° C. For a fixed MgO weight, various binder ratios ranging from 10 percent to 20 percent by weight were used to estimate optimum binder ratio. The MgO was blended with the PMMA/Xylene solution to form a paste. The paste was dried at about 175° C. to about 180° C. for about 45 min at ambient pressure to remove Xylene from the MgO/PMMA slurry. This resulted in a non-uniform flake-like structure. The resulting flakes of various sizes were converted into a coarse powder by mechanical grinding, using a standard mixer, resulting in a granular structured media having an average diameter of from about 0.4 mm to about 0.8 mm. The granular composition was further blended with $Fe_2O_3$ and calcium carbonate per the ratios specified above. Table 1 below indicates the blend composition loading structure for 100 grams of media.

TABLE 1

Blend Composition Loading Structure for 100 g of Media.

| | Media Composition (grams) | | | PMMA Binder | | Solvent |
|---|---|---|---|---|---|---|
| | Blend Ratios: MgO:PMMA | | | | | |
| Example | MgO | Fe2O3 | CaCO3 | Wt % | Wt (grams) | Xylene (ml) |
| 1 | 50 | 40 | 10 | 10 | 5 | 75.0 |
| 2 | 50 | 40 | 10 | 15 | 7.5 | 112.5 |
| 3 | 50 | 40 | 10 | 20 | 10 | 150.0 |

Examples 4-9

Preparation of Granules Including a Calcium Aluminum Silicate Binder

In certain embodiments including a calcium aluminum silicate binder, the inventive water purification compositions are prepared by mixing a magnesium oxide component with a calcium aluminum silicate binder.

In one such embodiment, the magnesium oxide component contains from about 20% to about 30% by weight of MgO, from about 60% to about 70% by weight of $Fe_2O_3$, and from about 8% to about 10% by weight of $CaCO_3$. In certain other embodiments, the magnesium oxide component also contains from about 1% to about 2% by weight of $MgAl_2O_4$.

Example Composition 4 was prepared by blending 20 grams of MgO, 70 grams of $Fe_2O_3$, and 10 grams of $CaCO_3$. An additional 3 grams of calcium aluminum silicate was added to the mixture. The entire composition was loaded into a granulation drum and water was added at approximately 5 minute intervals to create a uniform slurry. After obtaining the required uniformity, the slurry was passed through a sieve of known diameter and dried at room temperature. The dried granules were subjected to a high temperature of about 200° C. to remove volatile organic compounds.

Example Composition 5 was prepared by the same process as Example Composition 4, except that 15 grams of calcium aluminum silicate was added to the mixture.

Example Composition 6 was prepared by the same process as Example Composition 4, except that 10 grams of calcium aluminum silicate was added to the mixture.

Example Composition 7 was prepared by the same process as Example Composition 4, except that 5 grams of calcium aluminum silicate was added to the mixture.

Example Composition 8 was prepared by the same process as Example Composition 4, except that 2 grams of calcium aluminum silicate was added to the mixture.

Example Composition 9 was prepared by the same process as Example Composition 4, except that 1 grams of calcium aluminum silicate was added to the mixture.

Example 10

Analysis of Flow Rate of Contaminated Water and as and F Removal Efficiencies of Example Compositions 1-9

The analysis of the flow rate of the contaminated water and the arsenic and fluoride removal efficiency of Example Compositions 1-9 was carried out as follows.

Adsorption isotherm experiments: The batch experiments of adsorption isotherms were carried out using reference water samples spiked with 50 ppb of As(III) and 500 ppb of As(V) in accordance with the NSF53 reference standard solution preparation method, using distilled water at 25±2° C. 300 mL of the above reference samples were added into polyethylene bottles and different doses of adsorbent media (blend composition) was added. For example, in the set of experiments, the adsorbent doses used for the isotherm study were 0.1 g/L to 1.0 g/L. These bottles, with known amount of adsorbent doses, were then loaded onto a mechanical shaker and operated at an agitation speed of 200 rpm to 250 rpm for a duration of 4 to 8 hours. After the agitation was concluded, the samples were allowed to stand for 5 minutes, and then filtered. The filtrate was used for the quantification of arsenic. A similar procedure was used to determine short term isotherm equilibrium time, wherein the bottles were manually agitated for 15 minutes. The equilibrium time was found to be 6 hours for long term isotherms.

The fixed-bed column study was conducted using a column of 60 mm diameter and 700 mm length. The column was packed with Example Composition 4 for a depth of about 120 mm to about 150 mm. The column was charged with arsenic bearing reference water (prepared in accordance with the NSF530 standard with 50 ppb of As(III) and 300 ppb of As(V) and with other competing ions) in the down flow mode with a volumetric flow rate of 2 to 2.5 L/hour. The current flow rate was optimized to obtain necessary contact time of the sample with the adsorbent. The samples were collected at certain time intervals and were analyzed for the residual arsenic concentrations.

To evaluate the effect of granule size, adsorbent blend media with geometrical mean sizes of 0.1 mm to 1.0 mm were tested. It was determined that the maximum adsorption capability could be achieved with a mean particle diameter ranging from about 0.4 mm to about 0.8 mm.

The results for Example Compositions 1-3 containing a PMMA organic binder are set forth in Table 2. The results for Example Compositions 4-9 containing a calcium aluminum silicate binder with different granule sizes and binder percentages are set forth in Table 3. The results of the fixed-bed column study are set forth in Table 4.

TABLE 2

Flow Rate of Purified Water and Purification Efficiency in Composition Containing Polymethyl Methacrylate Binder.

| Example | Polymer Wt % | Flow rate of the purified water | Arsenic removal efficiency | Fluoride removal efficiency |
|---|---|---|---|---|
| 1 | 10 | Initial 2 L/hr; Reduced to 0 L/hr after passage of about 50 liters | 95%-100% | >95% |
| 2 | 15 | Initial 3 L/hr; stabilizes to 2 L/hr and remains the same. | 95%-98% | 85%-90% |
| 3 | 20 | Initial 3 L/hr; stabilizes to 2.5 to 3 L/hr and remains the same. | 90%-95% | 70%-80% |

TABLE 3

Flow Rate of Purified Water and Purification Efficiency in Composition Containing Calcium Aluminum Silicate Binder.

| Example | Inorganic Binder Wt % | Granule Size (mm) | As removal efficiency (%) Short term Isotherm (15 mm) | As removal efficiency (%) Long time isotherm (24 hrs) | Flow rate L/hr |
|---|---|---|---|---|---|
| 5 | 15 | long cylindrical structure (>2 mm) | 30 | 40 | very high (>5) |
| 6 | 10 | long cylindrical structure (>2 mm) | 50 | 60 | very high (>5) |
| 7 | 5 | 0.4-0.8 | 80-90 | 90-95 | 2.0-3.0 |
| 4 | 3 | 0.4-0.8 | 80-90 | 95-98 | 2.0-3.0 |
| 8 | 2* | 0.1-0.2 | 80-90 | 95-98 | <1 |
| 9 | 1* | 0.1-0.2 | 80-90 | 95-98 | <1 |

*Material structure is not stable, material is clogging the column

TABLE 4

Fixed-bed Column Test Results of 300 L Sample Test with NSF53 Reference Solution.

| Sampling intervals | Influent concentration of Arsenic (As(III) + As(V)) ppb | Effluent concentration of Arsenic (ppb) |
|---|---|---|
| 25% | 350 | <2 |
| 50% | 350 | <2 |
| 75% | 350 | <2 |
| 100% | 350 | <2 |
| 120% | 350 | <2 |

Although the subject matter has been described in considerable detail with reference to certain preferred embodiments thereof, other embodiments are possible. As such, the spirit and scope of the invention should not be limited to the description of the preferred embodiment contained therein.

We claim:

1. A granular water purification composition comprising a magnesium oxide component and a binder, wherein the binder comprises one or more aluminum silicates and wherein said one or more aluminum silicates are present in the water purification composition in an amount of about 1% to about 15% by weight.

2. The composition of claim 1, wherein the magnesium oxide component comprises MgO in an amount of about 40% to about 90% by weight.

3. The composition of claim 2, wherein the magnesium oxide component further comprises a pH regulator in an amount of about 8% to about 20% by weight.

4. The composition of claim 3, wherein the pH regulator comprises $CaCO_3$.

5. The composition of claim 2, wherein said magnesium oxide component further comprises about 30% to about 50% by weight of a water purifying material selected from the group consisting of $Fe_2O_3$, $TiO_2$, $MgAl_2O_4$, and combinations of two or more of these.

6. The composition of claim 1, wherein the composition is in the form of granules having a surface area of about 10 $m^2/g$ to about 200 $m^2/g$, and an average diameter of 0.2 to about 1 mm.

7. The composition of claim 1, wherein the granules have an average diameter of about 0.4 mm to about 0.8 mm.

8. The composition of claim 1 wherein said one or more aluminum silicates comprises sodium, magnesium, and/or barium aluminum silicates.

9. A water purification composition comprising: (a) binder comprising one or more aluminum silicates; and (b) a magnesium oxide component,
wherein the magnesium oxide component comprises: (i) about 40% to about 60% by weight MgO; (ii) about 30% to about 50% by weight $Fe_2O_3$; (iii) about 1% to about 5% by weight $MgAl_2O_4$; and (iv) about 8% to about 20% by weight $CaCO_3$ and wherein said one or more aluminum silicates are present in the water purification composition in an amount of about 1% to about 15% by weight.

10. The composition of claim 9 wherein said one or more aluminum silicates comprises sodium, magnesium, and/or barium aluminum silicates.

11. A granular water purification composition comprising a magnesium oxide component and a binder, wherein the binder comprises calcium aluminum silicate, and wherein the calcium aluminum silicate is present in an amount of about 1% to about 15% by weight.

12. The composition of claim 11, wherein the magnesium oxide component comprises magnesium oxide in an amount of about 10% to about 40% by weight.

13. The composition of claim 12, wherein said magnesium oxide component further comprises about 60% to about 70% by weight of a water purifying material selected from the group consisting of $Fe_2O_3$, $TiO_2$, $MgAl_2O_4$, and combinations of two or more of these.

14. The composition of claim 11, wherein the magnesium oxide component further comprises a pH regulator in an amount of about 7% to about 10% by weight.

15. The composition of claim 14, wherein the pH regulator comprises $CaCO_3$.

16. The composition of claim 11, wherein the composition is in the form of granules having a surface area of about 10 $m^2/g$ to about 200 $m^2/g$, and an average diameter of 0.2 to about 1 mm.

17. The composition of claim 11, wherein the granules have an average diameter of about 0.4 mm to about 0.8 mm.

18. A water purification composition comprising: (a) calcium aluminum silicate; and (b) a magnesium oxide component,
wherein the calcium aluminum silicate is present in an amount of about 1% to about 15% by weight, and
wherein the magnesium oxide component comprises: (i) about 10% to about 40% by weight MgO; (ii) about 60% to about 70% by weight $Fe_2O_3$; (iii) about 1% to about 5% by weight $MgAl_2O_4$; and (iv) about 7% to about 10% by weight $CaCO_3$.

19. The composition of claim 18, wherein the composition is in the form of granules having a surface area of about 10 $m^2/g$ to about 200 $m^2/g$, and an average diameter of 0.2 mm to about 1.0 mm.

20. A granular water purification composition comprising a magnesium oxide component and a binder, wherein the binder is calcium aluminum silicate, which is present in an amount of about 1% to about 10% by weight, and wherein the magnesium oxide component comprises: (a) MgO in an amount of about 20% by weight; (b) $Fe_2O_3$ in an amount of about 70% by weight; and (c) $CaCO_3$ in an amount of about 10% by weight.

21. The composition of claim 20, wherein the composition is in the form of granules having a surface area of about 10 $m^2/g$ to about 200 $m^2/g$, and an average diameter of 0.2 mm to about 1 mm.

22. The composition of claim 18, wherein the calcium aluminum silicate is present in about 2% to about 10% by weight.

* * * * *